Sept. 15, 1953

F. A. MARTIN ET AL 2,651,937

BALANCING MACHINE

Filed April 26, 1946

Inventors
Flyodd A. Martin &
Stephen J. Jeffery
By Blackmore, Spencer & Oliver
Attorneys Sept. 15, 1953  F. A. MARTIN ET AL  2,651,937
BALANCING MACHINE
Filed April 26, 1946  3 Sheets-Sheet 2

Inventors
Floyd A. Martin &
Stephen J. Jeffery
By Blackmore, Spencer & Hind
Attorneys Patented Sept. 15, 1953

2,651,937

UNITED STATES PATENT OFFICE 2,651,937

BALANCING MACHINE

Flyodd A. Martin and Stephen J. Jeffery, St. Catharines, Ontario, Canada, assignors to General Motors Corporation, Detroit, Mich., a corporation of Delaware Application April 26, 1946, Serial No. 665,287

6 Claims. (Cl. 73—66)

This invention relates broadly to balancing machines for determining, and indicating dynamic unbalance in amount, location and angular position of high speed rotating masses such as armatures, gyroscope rotors and the like.

Dynamic forces set up in high speed rotating masses may be highly objectionable and at the same time not possible to anticipate by static balancing. To closely simulate actual operating conditions it is desirable to balance rotating masses at or near their operating speeds. Mechanical balancing machines when used to determine the unbalance of masses rotating at high speeds are subject to very objectionable inertia forces which tend to create inaccuracies in the results obtained.

Great difficulties have heretofore been experienced in obtaining accurate data on angular position of unbalance from electronic balancing machines.

It is the object of the present invention to provide an improved electronic balancing machine which indicates accurately both the magnitude and angular position of dynamic unbalance forces in masses rotating at high speed.

It is another object of our invention to provide an electronic balancing machine which is simple in construction and foolproof in operation.

It is a further object of our invention to provide an electronic device for indicating the angular position of unbalanced inertia forces to greater accuracy than has heretofore been obtained using a sinusoidal signal to trigger the indicating device.

Another feature of the present invention is the use of a grid controlled gas filled tube to generate a saw tooth wave or pulse from the unbalance signal, and use this saw tooth wave or pulse to control the flashing of a grid controlled light discharge tube.

Other objects and advantages will be apparent and the invention itself will be best understood by reference to the following specification and accompanying drawings and will be specifically pointed out in the appended claims.

Figure 1:
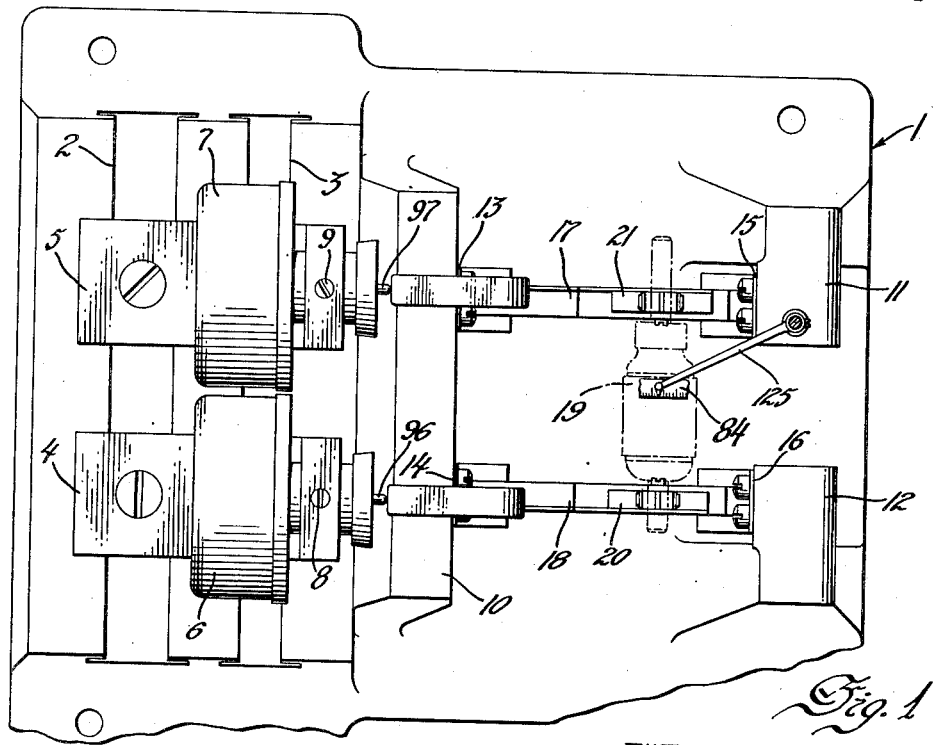
Fig. 1 is a top plan view of the balancing machine showing the means for mounting the mass to be balanced, the electrical transducers, and the linkage between the mass and the transducers. The mass to be balanced is, for the sake of illustration, shown as a small armature.
Figure 2:
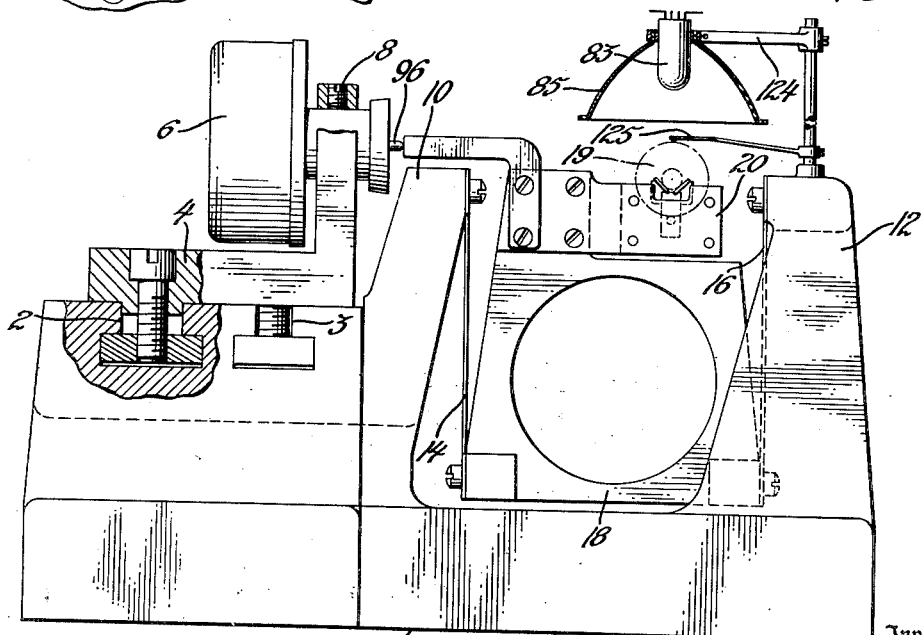
Fig. 2 is a side elevation view of the machine shown in Figure 1.
Figure 3:
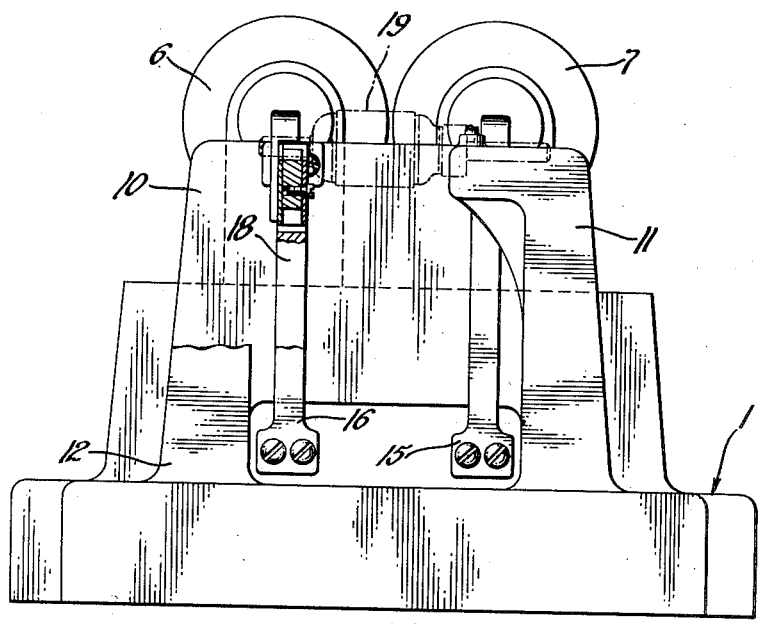
Fig. 3 is a front view, from operator's side, of the machine shown in Figure 1 with a cut away portion showing a means for securing the mounting blocks.

Referring to Figures 1 to 3, 1 indicates a suitable base of rigid construction having T slots 2 and 3. Mounted in T slots 2 and 3 are metal blocks for securing 4 and 5 to said base but providing means for adjusting the distance between electrical transducers 6 and 7 carried thereby. These transducers, here shown for the sake of convenience as crystal pickups, but in no wise limiting our invention, as any pressure responsive element may be used, are adjustably secured from axial movement by set screws 8 and 9.

Secured to supporting arms 10, 11 and 12 of base 1 are suspension means 13, 14, 15 and 16. These suspension means, here shown as metal straps, restrict the movement of the suspended carriages 17 and 18 in all directions but that axial to the transducers 6 and 7. The mass to be balanced 19 is rotatably mounted on the carriages 17 and 18 by resting in removable brackets 20 and 21. These brackets may be replaced by other brackets of somewhat different size and shape when it is desired to balance masses of greatly different dimensions than that illustrated in the figures. The mass being rotated is secured from axial movement by the screws 22 and 23 but the radial forces set up by the unbalanced mass against the brackets are transmitted through the carriages 17 and 18 to the sensitive elements 96 and 97 of the pickups.

Also secured to supporting arm 11 is a bracket 124 carrying the light emitting tube 83 and reflector 85. Rigidly attached to this same supporting arm is a pointer 125 for indicating the angular position of the dynamic unbalance. This pointer is here shown, for the sake of convenience as being so located as to indicate a point on the mass 90° from the plane in which the thrust is transmitted to the transducers. However, it may be located any known angle from that plane.

Figure 4:
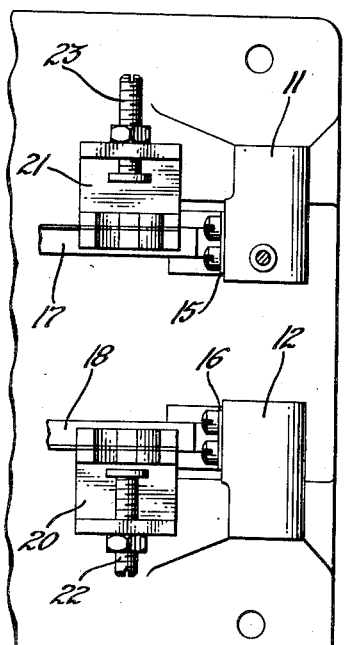
Fig. 4 is a partial top view of the device as shown in Figure 1 showing specific details of the method of mounting the mass to be balanced.
Figure 5:
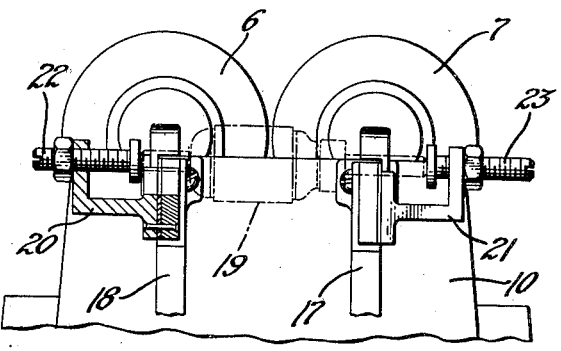
Fig. 5 is a partial front view of the device as shown in Figure 3 showing specific details of the method of mounting the mass to be balanced.

Referring to Figures 4 and 5, brackets 20 and 21, here shown as having V blocks to receive the spindle of armature 19, have adjusting screws 22 and 23 to position the armature in its axial direction and prevents its moving endwise from this adjusted position.

Figure 6:
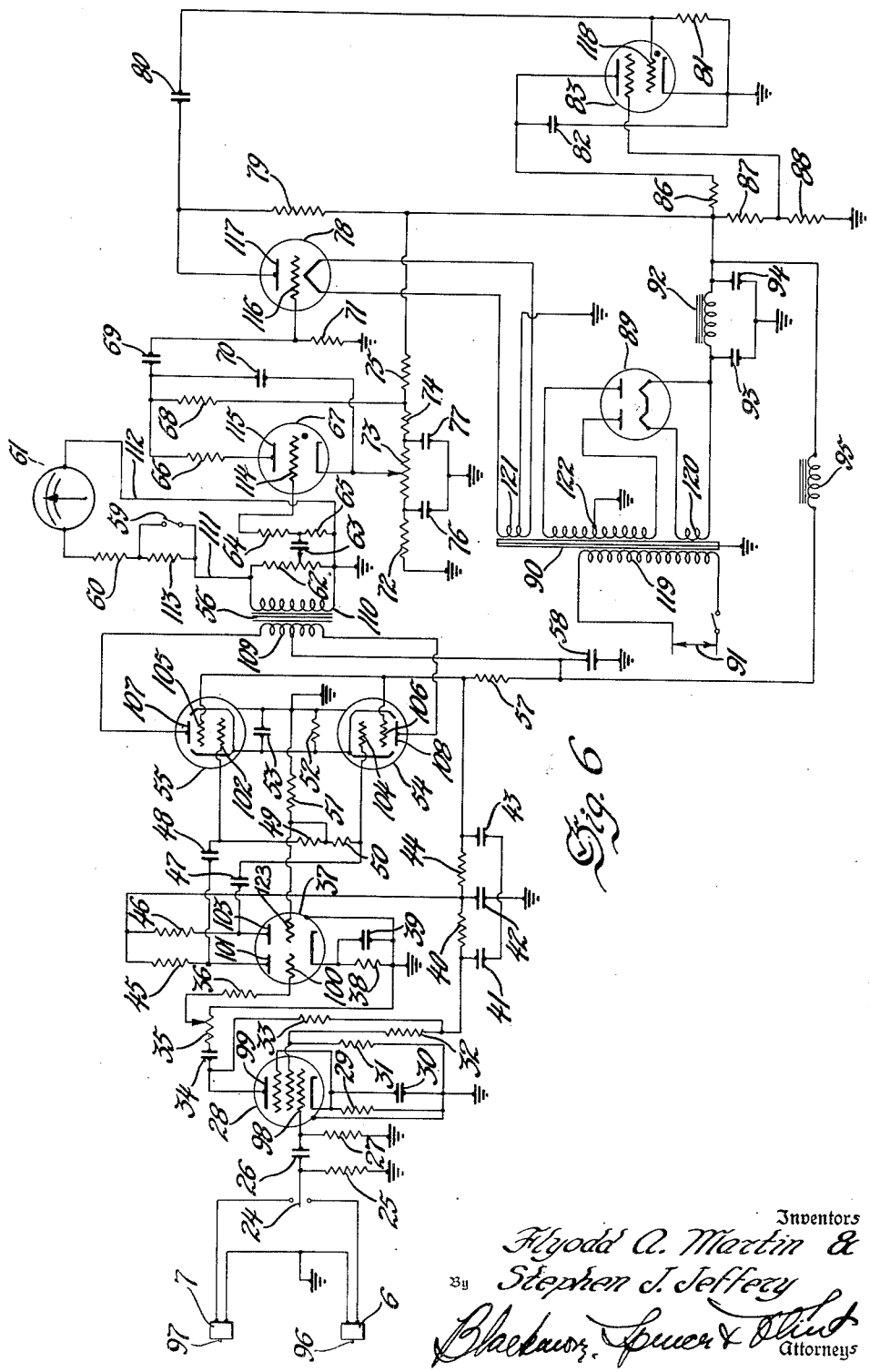
Fig. 6 is a schematic circuit diagram of the circuit utilized for amplifying, modifying and measuring the amplitude and angular position of the unbalance signal.

Referring to Figure 6 the crystal pickups 6 and 7 are alternately connected to the associated amplifying and control circuit by means of switch 24. These pickups, when the switch 24 is closed, are coupled to the control grid 98 of amplifier tube 28 by means of a resistance-capacity coupling consisting of resistances 25 and 27 and condenser 26.

The value of resistances 25 and 27 should be quite high to avoid loading the crystal pickups. In one embodiment of this invention using a 6J7 tube for amplifier tube 28 the value of 5 megohms for each of these resistors was found satisfactory. Condenser 26 protects the crystal pickups in case of failure of tube 28 as well as acting as a coupling condenser. The necessary capacitance of this condenser will vary with the frequency band of the signals to be transmitted, which in turn varies with the speed of rotation of the mass being balanced. For balancing masses rotating at comparatively high speed a value of .05 mfd. was found to be satisfactory. The control grid bias circuit for tube 28 consists of resistor 29 and condenser 30. The positive potential is applied to the screen grid through resistor 32; resistor 31 controlling the "no signal" current in the circuit.

The plate 99 on the output of the amplifier tube 28 is coupled to one of the grids 100 of the inverter tube 37 by means of a resistance capacity coupling resistors 33, 35 and 36 and condenser 34. Resistor 35 is made variable in order to calibrate meter 61. The grid bias network for tube 37 consists of resistor 38 and condenser 39. A resistance capacitance filter circuit including resistors 40 and 44 and condensers 41, 42 and 43 minimizes the power fluctuations reaching the amplifier and inverter tubes from the power supply.

Each half of the inverter tube 37 is coupled to a respective half of a push pull amplifier comprising tubes 54 and 55. One coupling circuit connects plate 101 to grid 102 of tube 55 through a coupling condenser 48, while the other coupling circuit connects plate 103 to grid 104 of tube 54 through coupling condenser 47. The plate circuits 101 and 103 contain current limiting resistors 45 and 46, respectively. Biasing resistors 49, 50 and 51 are interposed between ground and the grids 102, 104 and 123.

The push pull amplifier is of standard construction utilizing two power tubes 54 and 55. The control grid bias network for these tubes includes resistor 52 and condenser 53. The screen grid potential for grids 105 and 106 of the tubes is obtained through dropping resistor 57. The output of this push pull amplifier is coupled to the "meter" and stroboscopic circuit by a center tapped primary of transformer 56, the plates 107 and 108 of said tubes being connected directly to the opposite ends of the primary coil 109.

Meter 61 is used to indicate the magnitude of unbalance and may be any type of current or voltage measuring device. In this application it is shown as a rectifier type alternating current voltmeter which is connected directly across the secondary 110 through lines 111, 112 and series resistors 113 and 60. Switch 59 shunts resistor 113 in order to give two scales of indication on the meter, as shown in the drawings. The secondary 110 of transformer 56 is also coupled to the gas filled, grid controlled, tube 67 through a coupling circuit consisting of potentiometer 62, condenser 63 and resistors 64 and 65 to grid 114 of the tube. The main purpose of the pulse generating circuit including tube 67 is to obtain from the approximate sine wave signal received from transformer 56, a pulse or saw tooth wave having a steep wave front. This facilitates accurate triggering of the stroboscopic tube 83.

It is possible by means of potentiometer 62 to vary the strength of the unbalance signal appearing on grid 114 of tube 67 and thereby change the sensitivity of the pulse or saw tooth generating circuit so as to obtain proper operation of the grid controlled light discharge tube 83 with varying magnitudes of unbalance signal. Resistor 72, potentiometer 73, and condensers 76 and 77 are combined to form a negative grid bias circuit. The amount of grid bias, and therefore the signal strength necessary to "fire" tube 67, may be adjusted by positioning the center tap of potentiometer 73.

The saw tooth wave, the leading edge of which is used to fire the tube 83, is formed by the charge and discharge of condenser 70 which is connected to plate 115. This condenser is charged through a circuit including resistors 68 and 75 to a potential determined by the voltage output of the power supply, to be described later, and the value of resistors 72, 73, 74 and 75. Condenser 70 is discharged through a circuit including resistor 66 and plate 115 when tube 67 is conducting, thus forming the leading edge of the saw tooth wave mentioned above. The leading edge of this wave must be comparatively steep in order to assure that tube 83 will be fired at the correct position on the unbalance signal and thereby give the proper stroboscopic illumination of a graduated band 84 which is applied to and carried by the mass being balanced 19. For these reasons the resistor 66 is of much smaller value than resistor 68.

Tube 67 and the saw tooth wave forming circuit is coupled to amplifier tube 78 by a coupling including resistor 71 and condenser 69 feeding grid 116. The proper plate potential is furnished through plate 117 of tube 78 and through resistor 79. The amplified saw tooth wave as produced at the plate of tube 78 is coupled to the light discharge tube 83 by means of a resistance capacitance coupling including condenser 80, plate resistor 79 and grid resistor 81, and appears on control grid 118. The steep leading edge of the saw tooth wave produced by the discharge of condenser 70 when impressed on the grid 118 of the light discharge tube 83 causes it to fire giving off sufficient light to illuminate the dial or graduated band 84 on the mass 19 being balanced. The condenser 82 is charged through resistor 86 by the output voltage of the power supply, which voltage is also the plate potential of tube 83. The outer grid potential is determined by this output voltage and the values of resistors 87 and 88. Condenser 82 discharges directly through the tube to furnish illumination when the signal on the inner grid becomes the proper amplitude.

The power supply unit is of standard construction utilizing standard public utility alternating current power 91 and transformer 90 having a primary 119 and multiple secondary windings 120, 121 and 122. Center tapped secondary winding 121 furnishes heater current for the various tubes having indirectly heated cathodes, winding 120 furnishing current for the filament of the full wave rectifier tube 89, and the third or main secondary winding 122 furnishing current to be rectified by the rectifier 89. This rectified current is filtered by a filter consisting of choke 92 and condensers 93 and 94. An extra filter stage including choke 95 and condenser 58 is used for the plate supply for some of the tubes.

The operation of our invention in brief is as follows:

Referring to Figures 1 and 2, the mass to be balanced, here indicated as an armature 19, has the scale strip 84 applied thereto and is placed with each end on separate carriages 17 and 18 and rotated by means not shown. This means may be an air jet, a small belt, a flexible coupling or in the case of squirrel cage armatures by a rotating electrical field. Any out of balance is transmitted to electrical transducers, here shown as crystal pickups 6 and 7 where the mechanical vibration is transformed into electrical signals.

Referring to Figure 6 the selected pickup transmits a sinusoidal electrical signal to tube 28. Here it is amplified and transmitted to inverter tube 37. The signal from the inverter stage is amplified by the push pull amplifier including tubes 54 and 55. This signal is then transmitted through transformer 56 to meter 61 where it is rectified and its magnitude measured. This meter thereby gives a direct indication of the amount of unbalance.

A portion of this unbalance signal is picked off the potentiometer 62 and introduced to the grid of the gas filled tube 67. When this signal reaches sufficiently positive amplitude to overcome the negative grid bias of the tube so that the grid loses control, the tube will become highly conductive. This causes the condenser 70 to discharge forming a sharp wave front at the point where the increasing positive voltage of signal causes the grid of tube 67 to lose control.

This sharp pulse or saw tooth wave is amplified by tube 78 and impressed on the inner grid of light discharge tube 83. This sharp pulse or steep wave front causes the tube 83 to flash. This light energy is focused on the graduated paper strip on the armature by reflector 85.

The rotating mass, due to the stroboscopic illumination, appears to be standing still with the pointer 125 at some point on the graduated strip 84. The unbalance of the rotating mass is in the plane of thrust on the transducers at the instant of illumination. The operator therefore may easily determine its location by reading the graduated strip, knowing the location of the pointer with respect to the axis of thrust. The operator by reading the properly graduated meter 61 determines the magnitude of the dynamic unbalance. Thus by means of this invention an accurate determination of amplitude of error (meter 61) and of position of this error (flashing of tube 83) may be obtained. This balancing machine of unusual merit has been disclosed in the preferred form of its embodiment, but it will be understood that minor changes in construction may be made without departing from the spirit and scope of the appended claims and that parts thereof may be used in place of the whole if found desirable.

Having thus described our invention and set forth the manner of its construction and application, what we claim as new and desire to secure by Letters Patent, is:

1. A device for determining the magnitude and angular position of inertia forces in rotating masses including, a piezo electric crystal for transforming said inertia forces into electrical signals, an electrical amplifier for amplifying said signal connected thereto, means for indicating the magnitude of the amplified signal, an electrical network for producing a sawtooth wave having a steep wave front said electrical network including, a condenser across which said sawtooth wave is generated, a direct current source capable of charging said condenser, a grid controlled gaseous discharge tube responsive to said amplified signal for rapidly discharging said condenser, said indicating means and said network both connected to said amplifier, a gaseous discharge tube controlled by said sawtooth signal, said gaseous discharge tube being so positioned and associated with said rotating mass as to illuminate and so indicate the angular position of the said inertia forces.

2. A device for determining the magnitude and angular position of inertia forces in rotating masses including, a piezo electric crystal for transforming said inertia forces into electrical signals, an electrical amplifier for amplifying said signal connected thereto, means for indicating the magnitude of the amplified signal, an electrical network for producing a saw-toothed signal said electrical network including, a condenser across which said sawtooth wave is generated, a direct current source capable of charging said condenser, a grid controlled gaseous discharge tube responsive to said amplified signal for rapidly discharging said condenser, said indicating means and said network both connected to said amplifier, a light emitting tube controlled by said saw-toothed signal, said tube being so positioned and associated with said rotating mass as to illuminate and so indicate the angular position of the said inertia forces.

3. A device for determining the magnitude and angular position of unbalanced inertia forces in rotating masses including means for transforming said unbalanced forces into electrical signals, means for amplifying said signals, means for measuring the amplitude of said amplified electrical signals, an electrical network using a portion of said amplified signals to generate a sawtooth wave, said electrical network including a condenser across which said sawtooth wave is produced, a source of alternating current, means including a rectifier operatively connected to said source of alternating current for supplying direct current for charging said condenser, a grid controlled gaseous discharge tube responsive to said electrical signal for rapidly discharging said condenser, a light emitting tube controlled by said sawtoothed wave, and said light emitting tube being so positioned and associated with said rotating mass as to illuminate said mass in definite phase relationship to the said unbalanced inertia force.

4. A device for determining the magnitude and angular position of inertia forces in rotating masses including, a piezo-electric crystal for transforming said inertia forces into electrical signals, electronic means operatively connected to said crystal for amplifying said signals, means for indicating the magnitude of the amplified signal, an electrical network for producing a sawtooth wave having a steep wave front, said electrical network including, a condenser across which said sawtooth wave is generated, a direct current source capable of charging said condenser, a grid controlled gaseous discharge tube responsive to said amplified signal for rapidly discharging said condenser, said indicating means and said network both connected to said amplifier, a gaseous discharge tube controlled by said sawtooth signal, said gaseous discharge tube being so positioned and associated with said rotating mass as to illuminate and so indicate the angular position of the said inertia forces.

5. A device for determining the magnitude and angular position of inertia forces in rotating masses including, a piezo-electric crystal for transforming said inertia forces into electrical signals, electronic means operatively connected to said crystal for amplifying said signals, said electronic means including an amplifying tube, an inverter tube, and a pair of push pull amplifying tubes, means for indicating the magnitude of the amplified signal, an electrical network for producing a sawtoothed signal said electrical network including, a condenser across which said sawtooth wave is generated, a direct current source capable of charging said condenser, a grid controlled gaseous discharge tube responsive to said amplified signal for rapidly discharging said condenser, said indicating means and said network both connected to said amplifier, a light emitting tube controlled by said saw-toothed signal, said tube being so positioned and associated with said rotating mass as to illuminate and so indicate the angular position of the said inertia forces.

6. A device for determining the magnitude and angular position of inertia forces in rotating masses including, a piezo-electric crystal for transforming said inertia forces into electrical signals, electronic means operatively connected to said crystal for amplifying said signals, said electronic means including an amplifying tube, an inverter tube, and a pair of push pull amplifying tubes, meter means for measuring and indicating the magnitude of the amplified signal, transformer means disposed between and operatively connected to said electronic means and meter means, an electrical network for producing a sawtooth wave having a steep wave front said electrical network including, a condenser across which said sawtooth wave is generated, a source of alternating current, means including a rectifier operatively connected to said source of alternating current for supplying direct current for charging said condenser, a grid controlled gaseous discharge tube responsive to said amplified signal for rapidly discharging said condenser, said indicating means and said network both connected to said amplifier, a gaseous discharge tube controlled by said sawtooth signal, said gaseous discharge tube being so positioned and associated with said rotating mass as to illuminate and so indicate the angular position of the said inertia forces.

FLYODD A. MARTIN.
STEPHEN J. JEFFERY.

References Cited in the file of this patent
UNITED STATES PATENTS

| Number | Name | Date |
|---|---|---|
| 2,092,096 | Swedlund | Sept. 7, 1937 |
| 2,165,024 | Baker et al. | July 4, 1939 |
| 2,167,488 | Ohlson | July 25, 1939 |
| 2,383,405 | Merrill et al. | Aug. 21, 1945 |
| 2,521,141 | Allen | Sept. 5, 1950 |